United States Patent
Dammu et al.

(10) Patent No.: US 12,130,859 B2
(45) Date of Patent: Oct. 29, 2024

(54) METHOD AND SYSTEM FOR FEATURE BASED IMAGE RETRIEVAL

(71) Applicant: Tata Consultancy Services Limited, Mumbai (IN)

(72) Inventors: Preetam Prabhu Srikar Dammu, Hyderabad (IN); Srinivasa Rao Chalamala, Hyderabad (IN); Ajeet Kumar Singh, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 422 days.

(21) Appl. No.: 17/660,034

(22) Filed: Apr. 21, 2022

(65) Prior Publication Data
US 2022/0365963 A1 Nov. 17, 2022

(30) Foreign Application Priority Data
May 14, 2021 (IN) .............................. 202121021834

(51) Int. Cl.
*G06F 16/583* (2019.01)
*G06F 16/56* (2019.01)
*G06V 10/25* (2022.01)

(52) U.S. Cl.
CPC ............ *G06F 16/583* (2019.01); *G06F 16/56* (2019.01); *G06V 10/25* (2022.01)

(58) Field of Classification Search
CPC ....... G06F 16/583; G06F 16/56; G06V 10/25; G06V 10/82; G06V 40/171
See application file for complete search history.

(56) References Cited

U.S. PATENT DOCUMENTS

| | | | |
|---|---|---|---|
| 9,235,782 B1 * | 1/2016 | Zomet .................. | G06V 40/171 |
| 10,628,708 B2 | 4/2020 | Lin et al. | |
| 2019/0332849 A1 * | 10/2019 | Gupta .................... | G06N 3/045 |
| 2021/0319255 A1 * | 10/2021 | Pham .................... | G06V 10/82 |

FOREIGN PATENT DOCUMENTS

| CN | 105260412 A | * | 1/2016 |
| CN | 111522989 B | * | 10/2020 |

* cited by examiner

*Primary Examiner* — Umair Ahsan
(74) *Attorney, Agent, or Firm* — FINNEGAN, HENDERSON, FARABOW, GARRETT & DUNNER LLP (57) ABSTRACT

Image Retrieval is an application of computer vision that deals with searching images in large databases. Conventional methods utilize the entire image to perform the image retrieval task rather than considering specific features. The embodiments herein provide a method and system for feature based image retrieval. Initially, the system receives an input image and a query label. Further, a feature specific encoder is selected from a plurality of feature specific encoders based on the query label. A first set of feature vectors are computed from the input image using the selected feature specific encoder. Further, a Locality Sensitive Hashing (LSH) value is computed from the first set of feature vectors. Finally, a plurality of matching images is obtained from a plurality database images based on a comparison between the computed feature specific LSH value and a plurality of feature specific LSH values stored in a feature specific LSH database.

12 Claims, 9 Drawing Sheets

METHOD AND SYSTEM FOR FEATURE BASED IMAGE RETRIEVAL

PRIORITY CLAIM

This U.S. patent application claims priority under 35 U.S.C. § 119 to: India Application No. 202121021834, filed on May 14, 2021. The entire contents of the aforementioned application are incorporated herein by reference.

TECHNICAL FIELD

The disclosure herein generally relates to the field of computer vision and, more particular, to a method and system for feature based image retrieval.

BACKGROUND

Content-based Image Retrieval is an application of computer vision that deals with searching images in large databases. Here the image is searched based on the content of an input image rather than keywords, tags or descriptions associated with the input image. Here content includes colors, shapes, textures or any other information that is derived from the input image itself.

Conventional methods utilize the entire image to perform the image retrieval task. Some other conventional methods perform image retrieval based on keywords or metadata associated with the input image. Hence, the conventional methods fail to match only a particular feature within the object for image retrieval applications. Hence it is challenging to identify and disentangle important features of an image to perform image retrieval.

SUMMARY

Embodiments of the present disclosure present technological improvements as solutions to one or more of the above-mentioned technical problems recognized by the inventors in conventional systems. For example, in one embodiment, a method for feature based image retrieval is provided. The method includes receiving, by one or more hardware processors, an input image and a corresponding query label, wherein the query label indicates a Region of Interest (ROI). The method further includes selecting, by the one or more hardware processors, a feature specific encoder from a plurality of feature specific encoders based on the ROI, wherein the plurality of feature specific encoders are pretrained using a mask based loss function. Furthermore, the method includes computing, by the one or more hardware processors, a first set of feature vectors corresponding to the ROI based on the selected feature specific encoder. Furthermore, the method includes computing, by the one or more hardware processors, a feature specific Locality Sensitive Hashing (LSH) value corresponding to the ROI based on the first set of feature vectors. Finally, the method includes obtaining, by the one or more hardware processors, a plurality of matching images from the plurality database images based on a comparison between the computed feature specific LSH value and a plurality of feature specific LSH values stored in a feature specific LSH database, wherein the feature specific LSH database is generated based on the plurality of database images and the plurality of feature specific encoders.

In another aspect, a system for feature based image retrieval is provided. The system includes at least one memory storing programmed instructions, one or more Input/Output (I/O) interfaces, and one or more hardware processors operatively coupled to the at least one memory, wherein the one or more hardware processors are configured by the programmed instructions to receive an input image and a corresponding query label, wherein the query label indicates a Region of Interest (ROI). Further, the one or more hardware processors are configured by the programmed instructions to select a feature specific encoder from a plurality of feature specific encoders based on the ROI, wherein the plurality of feature specific encoders are pretrained using a mask based loss function. Furthermore, the one or more hardware processors are configured by the programmed instructions to compute a first set of feature vectors corresponding to the ROI based on the selected feature specific encoder. Furthermore, the one or more hardware processors are configured by the programmed instructions to compute a feature specific Locality Sensitive Hashing (LSH) value corresponding to the ROI based on the first set of feature vectors. Finally, the one or more hardware processors are configured by the programmed instructions to obtain a plurality of matching images from the plurality database images based on a comparison between the computed feature specific LSH value and a plurality of feature specific LSH values stored in a feature specific LSH database, wherein the feature specific LSH database is generated based on the plurality of database images and the plurality of feature specific encoders.

In yet another aspect, a computer program product including a non-transitory computer-readable medium having embodied therein a computer program for feature based image retrieval is provided. The computer readable program, when executed on a computing device, causes the computing device to receive an input image and a corresponding query label, wherein the query label indicates a Region of Interest (ROI). Further, the computer readable program, when executed on a computing device, causes the computing device to select a feature specific encoder from a plurality of feature specific encoders based on the ROI, wherein the plurality of feature specific encoders are pretrained using a mask based loss function. Furthermore, the computer readable program, when executed on a computing device, causes the computing device to compute a first set of feature vectors corresponding to the ROI based on the selected feature specific encoder. Furthermore, the computer readable program, when executed on a computing device, causes the computing device to compute a feature specific Locality Sensitive Hashing (LSH) value corresponding to the ROI based on the first set of feature vectors. Finally, the computer readable program, when executed on a computing device, causes the computing device to obtain a plurality of matching images from the plurality database images based on a comparison between the computed feature specific LSH value and a plurality of feature specific LSH values stored in a feature specific LSH database, wherein the feature specific LSH database is generated based on the plurality of database images and the plurality of feature specific encoders.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Embodiments herein provide a method and system for feature based image retrieval for retrieving one or more matching images with similar feature from an image set. For example, if a query feature is nose of a face image, the method and system for feature based image retrieval can retrieve a plurality of face images with a similar nose. If the query feature is a car, the system can retrieve a plurality if images with the similar car object in it. Initially, the system receives an input image and a query label. Further, a feature specific encoder is selected from a plurality of feature specific encoders based on the query label. A first set of feature vectors are computed from the input image using the selected feature specific encoder. Further, a Locality Sensitive Hashing (LSH) value is computed from the first set of feature vectors. Finally, a plurality of matching images are obtained from a plurality database images based on a comparison between the computed feature specific LSH value and a plurality of feature specific LSH values stored in a feature specific LSH database.

Referring now to the drawings, and more particularly to FIGS. 1 through 6D, where similar reference characters denote corresponding features consistently throughout the figures, there are shown preferred embodiments and these embodiments are described in the context of the following exemplary system and/or method.

Figure 1:
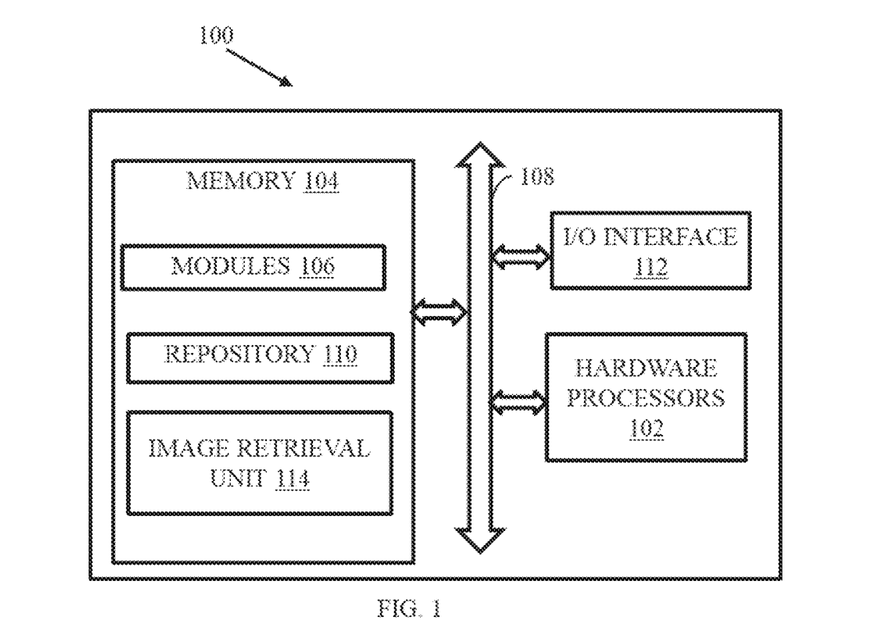
FIG. 1 is a functional block diagram of a system for feature based image retrieval, in accordance with some embodiments of the present disclosure.

FIG. 1 is a functional block diagram of a system 100 for feature based image retrieval, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 are configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106 and an image retrieval unit 114. The memory 104 also includes a data repository (or repository) 110 for storing data processed, received, and generated by the plurality of modules 106 and the image retrieval unit 114.

The plurality of modules 106 include programs or coded instructions that supplement applications or functions performed by the system 100 for feature based image retrieval. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for feature based image retrieval.

The data repository (or repository) 110 may include a plurality of abstracted piece of code for refinement and data that is processed, received, or generated as a result of the execution of the plurality of modules in the module(s) 106 and the modules associated with image retrieval unit 114. In an embodiment, modules such as a feature specific encoder selection module, a feature vector computation module, a LSH value computation module and a matching module are present inside image retrieval unit 114. The data repository may also include a plurality of images, a plurality of feature specific encoders and a feature specific LSH database.

Although the data repository 110 is shown internal to the system 100, it will be noted that, in alternate embodiments, the data repository 110 can also be implemented external to the system 100, where the data repository 110 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

Figure 2:
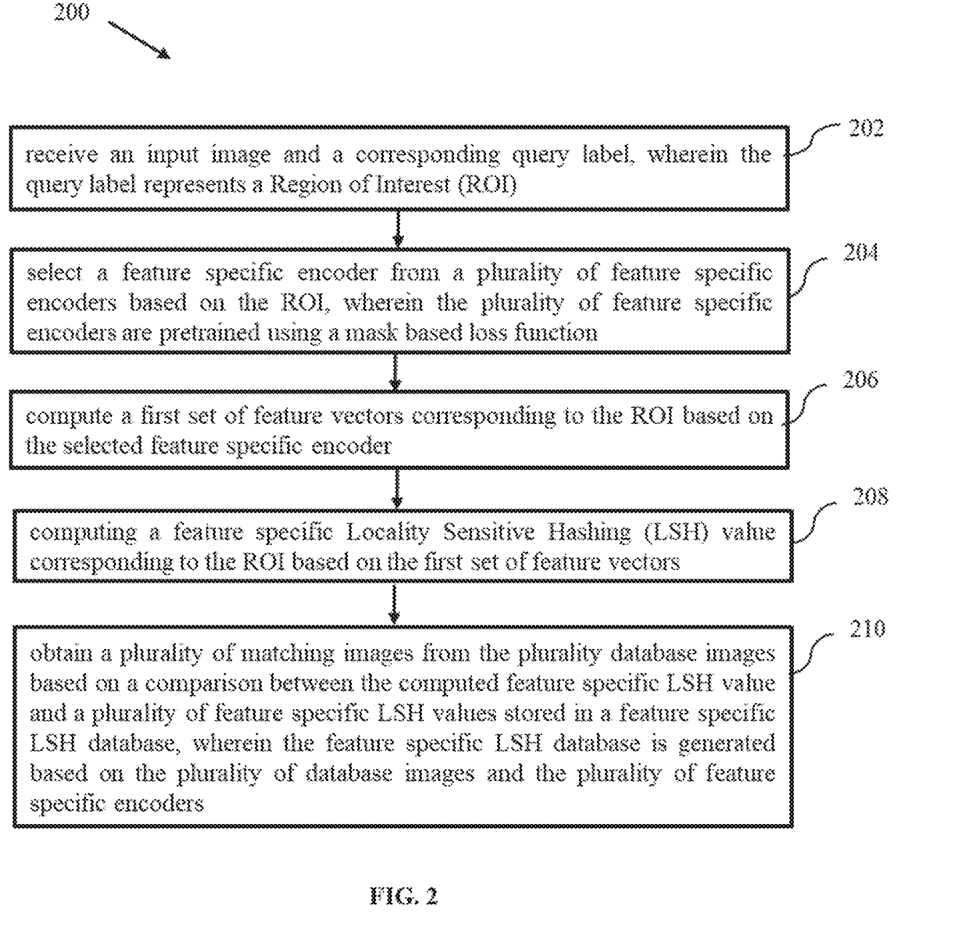
FIG. 2 is an exemplary flow diagram illustrating a method for feature based image retrieval, implemented by the system of FIG. 1, in accordance with some embodiments of the present disclosure.

FIG. 2 is an exemplary flow diagram illustrating a method 200 for feature based image retrieval implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

Figure 3A:
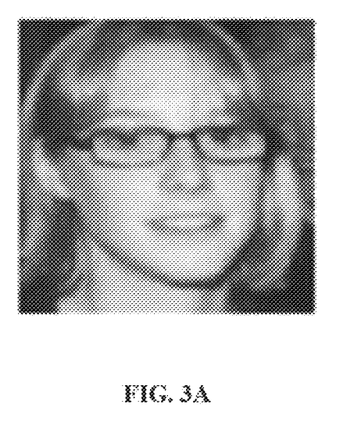
FIG. 3A illustrates a first-stage input query image and a region of interest (ROI) for a processor implemented method for feature based image retrieval implemented by the system of FIG. 1, in accordance with some embodiments of the present disclosure.
Figure 3B:
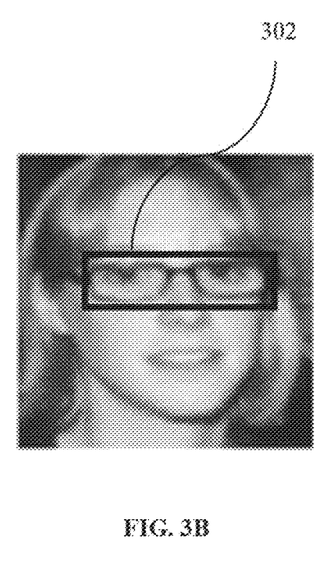
FIG. 3B illustrates a second-stage input query image and a region of interest (ROI) for a processor implemented method for feature based image retrieval implemented by the system of FIG. 1, in accordance with some embodiments of the present disclosure.

At step 202 of the method 200, the one or more hardware processors 102 receive an input image and a corresponding query label. The query label indicates a Region of Interest (ROI). For example, the query image is as given in FIG. 3A and the query label is as given in FIG. 3B. Now referring to FIG. 3B, 302 represents the ROI which is eyes with spectacles of a face image.

Figure 3C:
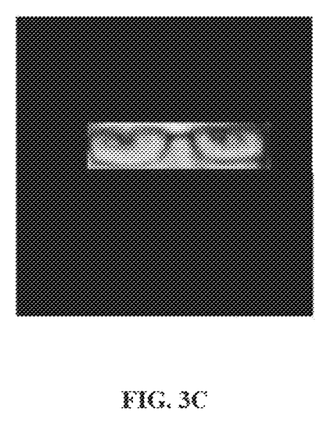
FIG. 3C illustrates a third-stage input query image and a region of interest (ROI) for a processor implemented method for feature based image retrieval implemented by the system of FIG. 1, in accordance with some embodiments of the present disclosure.

At step 204 of the method 200, the one or more hardware processors 102 select a feature specific encoder from a plurality of feature specific encoders based on the ROI. The feature specific encoder selected is based on a predefined mapping between the query label and the plurality of feature specific encoders. The plurality of feature specific encoders are pretrained using a mask based loss function as given in equation (1). The plurality of feature specific encoders are trained by initially receiving a plurality of training images associated with a plurality of ROIs and a plurality of query labels corresponding to each of the plurality of ROIs associated with each of the plurality of training images. Further, an augmented dataset is generated corresponding to each of the plurality of query labels by masking each of the plurality of images based on the plurality of ROIs. Post masking, only the plurality of ROIs from the input image are retained for further processing. For example, FIG. 3C illustrates an output associated with masking, depicting only the selected ROI. In the final training step, the plurality of feature specific encoders corresponding to each of the plurality of query labels are obtained by training a plurality of disentangling autoencoders with a corresponding augmented dataset.

Upon identifying the feature specific label based on the query-label, at step 206 of the method 200, the one or more hardware processors 102 compute a first set of feature vectors corresponding to the ROI based on the selected feature specific encoder. For example, the first set of feature vectors corresponding to the input image shown in FIG. 3A is of size 1×100. Some of the features from the 1×100 feature set are [1.1100459, −3.1625597, 1.0934602, 1.1623713, 4.6362596, 1.4791032, 0.46647954, 0.3536477, −1.1535722, −0.37241423, −1.5053642, 2.7136922, 3.069385, 3.2542326, 2.4091725, −0.5400206, 0.99248505, 0.09519203, −1.0644773, 4.2841134, −2.0133207, −2.3531446, −1.582107, 0.6325499, . . . ].

At step 208 of the method 200, the one or more hardware processors 102 compute a feature specific Locality Sensitive Hashing (LSH) value corresponding to the ROI based on the first set of feature vectors. For example, the LSH value for the ROI shown in FIG. 3A can be d177p8f8s2. Here, the hash size is 10.

At step 210 of the method 200, the one or more hardware processors 102 obtain a plurality of matching images from the plurality database images based on a comparison between the computed feature specific LSH value and a plurality of feature specific LSH values stored in a feature specific LSH database. The feature specific LSH database is initially generated based on the plurality of database images and the plurality of feature specific encoders. To generate the feature specific LSH database at first a second set of feature vectors corresponding to each of the plurality of database images are computed based on the corresponding feature specific encoder from the plurality of feature specific encoders. Thereafter, a feature specific LSH database corresponding to each of the plurality of feature vectors is generated by computing the LSH value for each of the corresponding feature vector. Finally, a pointer is established between each of the plurality of feature specific encoders and the corresponding feature specific LSH database.

Figure 4:
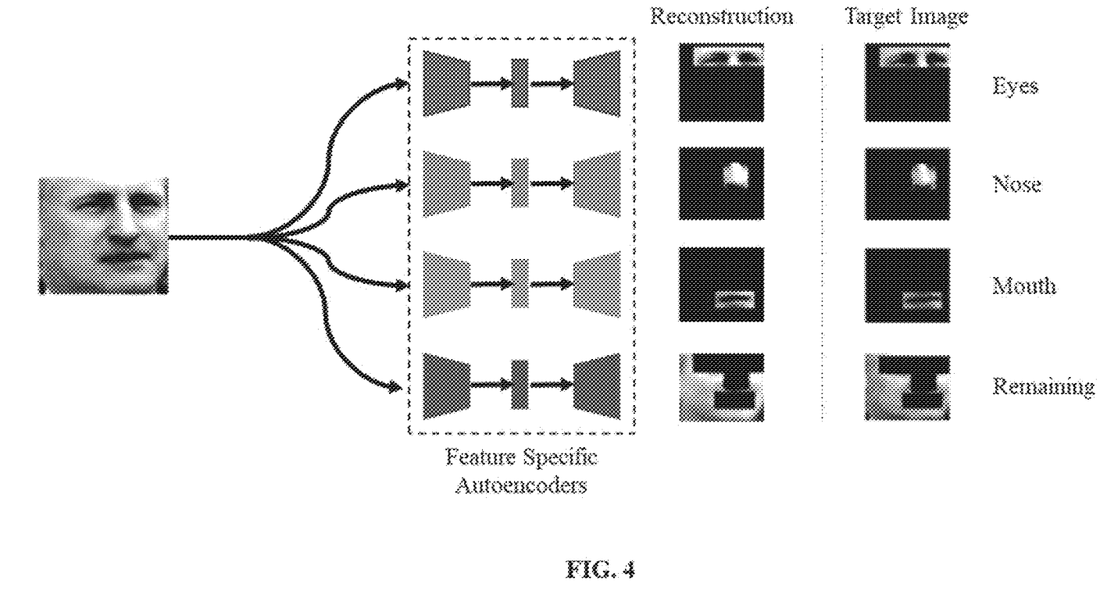
FIG. 4 illustrates plurality of feature specific encoders for the processor implemented method for feature based image retrieval implemented by the system of FIG. 1, in accordance with some embodiments of the present disclosure.

LSH is a hashing technique that aims to categorize similar items into the same bucket. In the context of feature specific encodings, images that might look very different as a whole can still be categorized into the same bucket if the feature regions of these images are visually similar. This is due to the fact that feature specific encodings are a function of the ROI and not the entire image. Thus, the plurality of LSH databases corresponding to each of the plurality of features of importance are maintained In an embodiment, the plurality of disentangling autoencoders utilized to obtain the plurality of feature specific encoders corresponding to each of the plurality of query labels are constructed using Modular Neural Network (MNN). Here, dedicated modules are allocated for each of a plurality of images associated with the training image set. For example, if the training image set is a facial data set, then a corresponding MNN module is allocated for extracting each of the plurality of features including eyes, nose, mouth and one for the rest of the features as shown in FIG. 4.

The disentangling autoencoders used in the present disclosure are undercomplete autoencoders, a type of autoencoder which has a latent dimension lower than the input dimension. Undercomplete autoencoders are trained to reconstruct the original image as accurately as possible while constructing the latent space to a sufficiently small dimension to ensure that only the most salient features are retained in the encoded latent vectors.

In an embodiment, each of the plurality of disentangling autoencoders are trained using a corresponding feature to obtain the plurality of feature specific encoders. Here, the target image is a masked version of the input image wherein the masking procedure ensures that only features that are of interest are present while all of the pixels corresponding to other regions are blacked out. Consequently, the autoencoder is impelled to identify and learn a pattern of relationship between the input image and regions that are marked to be of importance in the target image. The learning of this relationship is driven by the mask based loss function given in equation (1), which computes the visual dissimilarity between the input image and the masked target image. The computed visual similarity enforces the autoencoder to generate output image containing only the filtered important regions. During this process, since the bottleneck layer of the autoencoder is able to only preserve limited information, the feature vector generated at the bottleneck layer accurately encodes the required ROI while discarding any irrelevant information.

In an embodiment, the mask based loss function associated with the autoencoders is given by the following equation.

$$\text{Mask based loss function} = L(x, g(f(x'))) \quad (1)$$

where L is the loss function to be minimized, L penalizes if $g(f(x'))$ is dissimilar from x, wherein L is any distance metric for example, Minimum Square Error (MSE), perceptual distance, cosine similarity, . . . etc. wherein g is the decoder function, f is the encoder function, x is the input image and x' is the masked target image.

FIG. 4 illustrates the plurality of feature specific encoders for the processor implemented method for feature based image retrieval implemented by the system of FIG. 1, in accordance with some embodiments of the present disclosure. Now referring to FIG. 4, the MNN includes the plurality of feature specific encoders corresponding to each of the plurality of features. The plurality of autoencoders learn separate and distinct latent representations for different ROIs. To achieve this, the input image is masked to retain only the ROI of that specific module and present it as the target image as shown in FIG. 4. After the autoencoders have been trained, only the encoder part of the autoencoder is retained.

Figure 5:
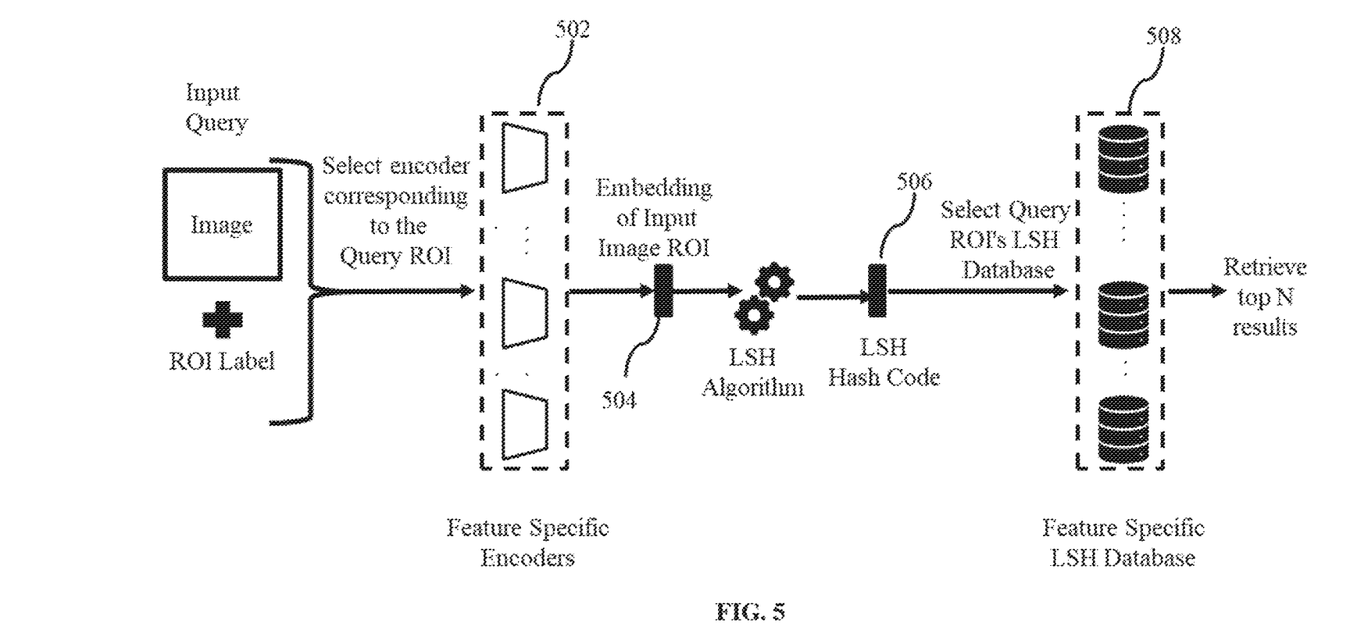
FIG. 5 is an exemplary architecture for the processor implemented method for feature based image retrieval implemented by the system of FIG. 1, in accordance with some embodiments of the present disclosure.

The method 200 is further explained in conjunction with an overall architecture explained using FIG. 5. FIG. 5 illustrates an overall architecture for the processor implemented method for feature based image retrieval implemented by the system of FIG. 1, in accordance with some embodiments of the present disclosure. Now referring to FIG. 5, a feature specific encoder is selected from the plurality of feature specific encoders by the feature specific encoder selection module 502 based on the input image and the ROI. Further, the first set of feature vectors are computed based on the selected feature specific encoder using the feature vector computation module 504. Further, the LSH value is computed by the LSH value computation module 506 using the LSH algorithm. Further, the computed LSH value is used to query the feature specific LSH database by the matching module 508 to obtain the plurality of matching images.

In an embodiment, the system 100 is experimented as follows: 6A to 6D illustrates experimental results for the processor implemented method for feature based image retrieval implemented by the system of FIG. 1, in accordance with some embodiments of the present disclosure.

Figure 6A:
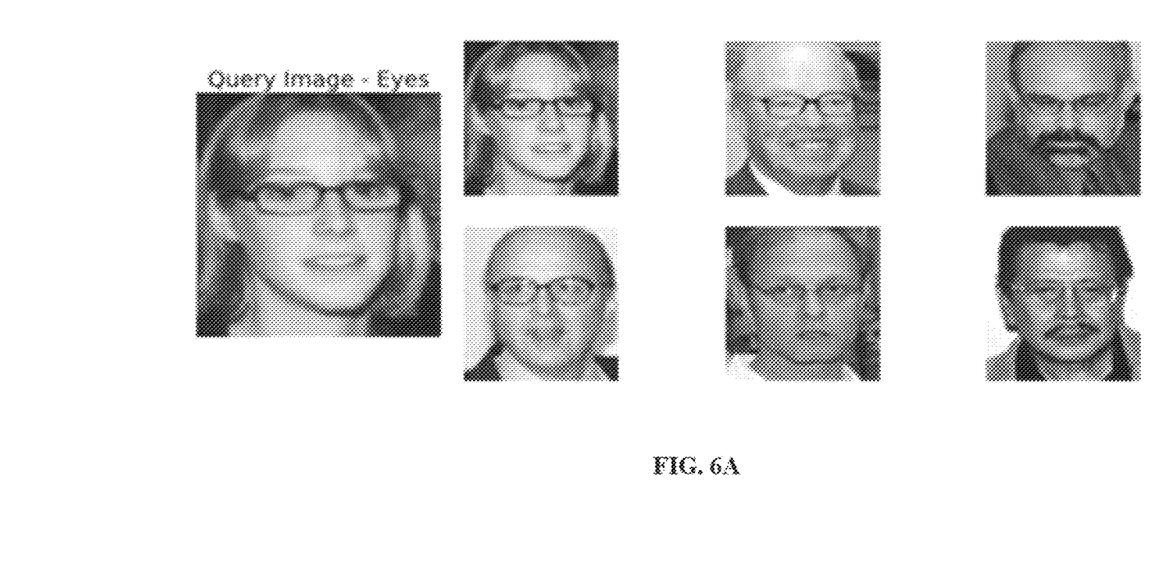
FIG. 6A illustrates first experimental results for the processor implemented method for feature based image retrieval implemented by the system of FIG. 1, in accordance with some embodiments of the present disclosure.

Now referring to FIG. 6A, the person in the query image is wearing spectacles and the region of interest is given as eyes. As a result, the retrieval system fetches result in which all of the persons are wearing eyeglasses which are quite similar to what the person in the query image is wearing (shape and frame type is similar in most cases). The most important point to notice in FIG. 9 is that none of the fetched images have overall similarity but are very similar at a feature-level that is in focus. In a generic image retrieval system, the probability that images of a bearded man is fetched for a query image containing a woman is quite low, even if they are wearing the exact same facial accessories. In applications that more focused on individual features or facial accessories, generic image retrieval systems might not be useful at all while the method disclosed can handle the requirements by giving the flexibility of choosing the region of interest.

Figure 6B:
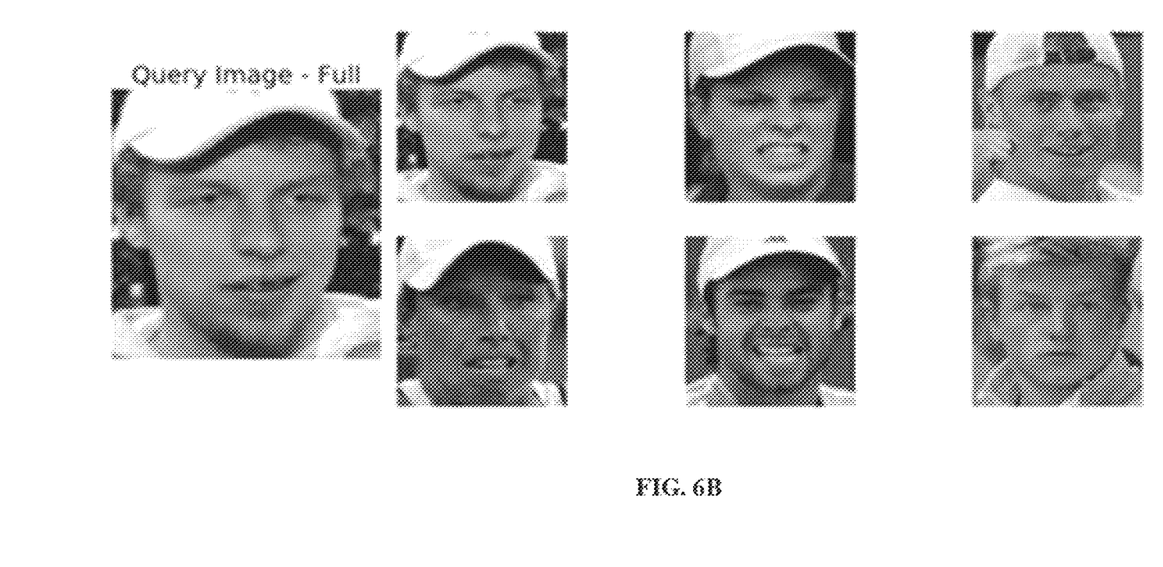
FIG. 6B illustrates second experimental results for the processor implemented method for feature based image retrieval implemented by the system of FIG. 1, in accordance with some embodiments of the present disclosure.
Figure 6C:
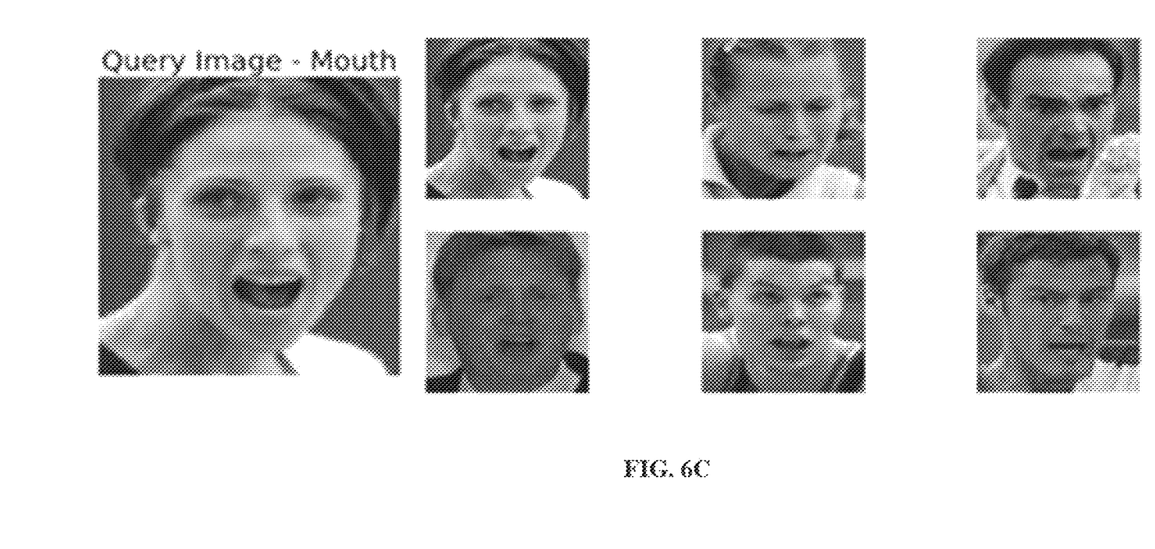
FIG. 6C illustrates third experimental results for the processor implemented method for feature based image retrieval implemented by the system of FIG. 1, in accordance with some embodiments of the present disclosure.
Figure 6D:
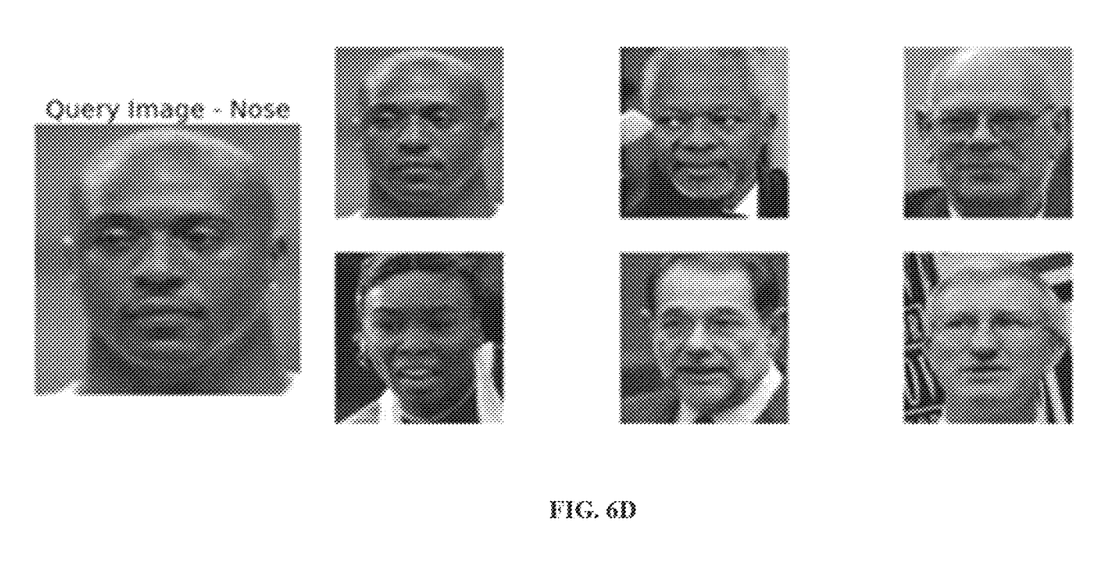
FIG. 6D illustrates fourth experimental results for the processor implemented method for feature based image retrieval implemented by the system of FIG. 1, in accordance with some embodiments of the present disclosure.

Referring to FIG. 6B, it is observed that the retrieved results have an overall similarity (entire face, including accessories like a cap). Referring to FIG. 6C, it is observed that mouth region is similar in all of the images. It can also observed that other features have drastic differences (different gender, background accessories and the like), yet these have not impacted the retrieval process and desired results and objective have been achieved. Referring to FIG. 6D, it can be observed that all the results have similar looking nose region (nose shape, size and the like). Other features and background did not have an impact on the result, thus focusing only on query label based image retrieval The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of feature based image retrieval. The present disclosure can retrieve a plurality of images having similar feature. For example, if the query label or ROI is a nose, the system retrieves a plurality of face images with similar nose feature. The present disclosure includes a feature specific encoder for each of the plurality of features and further includes a feature specific LSH database. The feature specific encoder and the feature specific LSH database increases the efficiency to the system in terms of speed and accuracy.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
   receiving, by one or more hardware processors, an input image and a corresponding query label, wherein the query label indicates a Region of Interest (ROI);
   selecting, by the one or more hardware processors, a feature specific encoder from a plurality of feature specific encoders based on the ROI, wherein the plurality of feature specific encoders are pretrained using a mask based loss function;
   computing, by the one or more hardware processors, a first set of feature vectors corresponding to the ROI based on the selected feature specific encoder;
   computing, by the one or more hardware processors, a feature specific Locality Sensitive Hashing (LSH) value corresponding to the ROI based on the first set of feature vectors; and
   obtaining, by the one or more hardware processors, a plurality of matching images from a plurality of database images based on a comparison between the computed feature specific LSH value and a plurality of feature specific LSH values stored in a feature specific LSH database, wherein the feature specific LSH database is generated based on the plurality of database images and the plurality of feature specific encoders.

2. The method of claim 1, wherein pretraining the plurality of feature specific encoders comprises:
   receiving a plurality of training images associated with a plurality of ROIs and a plurality of query labels corresponding to each of the plurality of ROIs associated with each of the plurality of training images;
   creating an augmented dataset corresponding to each of the plurality of query labels by masking each of the plurality of images based on the plurality of ROIs, wherein the plurality of ROIs are retained after masking; and
   generating the plurality of feature specific encoders corresponding to each of the plurality of query labels by training a plurality of disentangling autoencoders with a corresponding augmented dataset.

3. The method of claim 1, wherein generating the feature specific LSH database comprises:
   receiving the plurality of database images and the plurality of feature specific encoders;

computing a second set of feature vectors corresponding to each of the plurality of database images based on the corresponding feature specific encoder from the plurality of feature specific encoders;
generating a feature specific LSH database corresponding to each of the plurality of feature vectors by computing the LSH value for each of the corresponding feature vector; and
establishing a pointer between each of the plurality of feature specific encoders and the corresponding feature specific LSH database.

4. The method of claim 1, wherein selecting the feature specific encoder is based on a predefined mapping between the query label and the plurality of feature specific encoders.

5. A system comprising:
at least one memory storing programmed instructions;
one or more Input/Output (I/O) interfaces; and
one or more hardware processors operatively coupled to the at least one memory, wherein the one or more hardware processors are configured by the programmed instructions to:
receive an input image and a corresponding query label, wherein the query label indicates a Region of Interest (ROI);
select a feature specific encoder from a plurality of feature specific encoders based on the ROI, wherein the plurality of feature specific encoders are pretrained using a mask based loss function; compute a first set of feature vectors corresponding to the ROI based on the selected feature specific encoder;
compute a feature specific Locality Sensitive Hashing (LSH) value corresponding to the ROI based on the first set of feature vectors; and
obtain a plurality of matching images from a plurality of database images based on a comparison between the computed feature specific LSH value and a plurality of feature specific LSH values stored in a feature specific LSH database, wherein the feature specific LSH database is generated based on the plurality of database images and the plurality of feature specific encoders.

6. The system of claim 5, wherein pretraining the plurality of feature specific encoders comprises:
receiving a plurality of training images associated with a plurality of ROIs and a plurality of query labels corresponding to each of the plurality of ROIs associated with each of the plurality of training images;
creating an augmented dataset corresponding to each of the plurality of query labels by masking each of the plurality of images based on the plurality of ROIs, wherein the plurality of ROIs are retained after masking; and
generating the plurality of feature specific encoders corresponding to each of the plurality of query labels by training a plurality of disentangling autoencoders with a corresponding augmented dataset.

7. The system of claim 5, wherein generating the feature specific LSH database comprises:
receiving the plurality of database images and the plurality of feature specific encoders;
computing a second set of feature vectors corresponding to each of the plurality of database images based on the corresponding feature specific encoder from the plurality of feature specific encoders;
generating a feature specific LSH database corresponding to each of the plurality of feature vectors by computing the LSH value for each of the corresponding feature vector; and
establishing a pointer between each of the plurality of feature specific encoders and the corresponding feature specific LSH database.

8. The system of claim 5, wherein selecting the feature specific encoder is based on a predefined mapping between the query label and the plurality of feature specific encoders.

9. One or more non-transitory machine readable information storage mediums comprising one or more instructions which when executed by one or more hardware processors causes:
receiving, by one or more hardware processors, an input image and a corresponding query label, wherein the query label indicates a Region of Interest (ROI);
Selecting, by the one or more hardware processors, a feature specific encoder from a plurality of feature specific encoders based on the ROI, wherein the plurality of feature specific encoders are pretrained using a mask based loss function;
computing, by the one or more hardware processors, a first set of feature vectors corresponding to the ROI based on the selected feature specific encoder; computing, by the one or more hardware processors, a feature specific Locality Sensitive Hashing (LSH) value corresponding to the ROI based on the first set of feature vectors; and
obtaining, by the one or more hardware processors, a plurality of matching images from a plurality of database images based on a comparison between the computed feature specific LSH value and a plurality of feature specific LSH values stored in a feature specific LSH database, wherein the feature specific LSH database is generated based on the plurality of database images and the plurality of feature specific encoders.

10. The one or more non-transitory machine readable information storage mediums of claim 9, wherein pretraining the plurality of feature specific encoders comprises:
receiving a plurality of training images associated with a plurality of ROIs and a plurality of query labels corresponding to each of the plurality of ROIs associated with each of the plurality of training images;
creating an augmented dataset corresponding to each of the plurality of query labels by masking each of the plurality of images based on the plurality of ROIs, wherein the plurality of ROIs are retained after masking; and
generating the plurality of feature specific encoders corresponding to each of the plurality of query labels by training a plurality of disentangling autoencoders with a corresponding augmented dataset.

11. The one or more non-transitory machine readable information storage mediums of claim 9, wherein generating the feature specific LSH database comprises:
receiving the plurality of database images and the plurality of feature specific encoders;
computing a second set of feature vectors corresponding to each of the plurality of database images based on the corresponding feature specific encoder from the plurality of feature specific encoders;
generating a feature specific LSH database corresponding to each of the plurality of feature vectors by computing the LSH value for each of the corresponding feature vector; and
establishing a pointer between each of the plurality of feature specific encoders and the corresponding feature specific LSH database.

12. The one or more non-transitory machine readable information storage mediums of claim 9, wherein selecting the feature specific encoder is based on a predefined mapping between the query label and the plurality of feature specific encoders.

\* \* \* \* \*